United States Patent
Palmer et al.

(10) Patent No.: US 12,515,245 B2
(45) Date of Patent: Jan. 6, 2026

(54) ANAEROBIC DIGESTION OF AGGREGATE CELLULOSE PULP

(71) Applicant: Bouldin Corporation, Morrison, TN (US)

(72) Inventors: David C. Palmer, Franklin, TN (US); Rodrigo B. Vera, Leeds, AL (US); Terry L. Moore, Brentwood, TN (US)

(73) Assignee: Bouldin Corporation, Morrison, TN (US)

( * ) Notice: Subject to any disclaimer, the term of this patent is extended or adjusted under 35 U.S.C. 154(b) by 426 days.

(21) Appl. No.: 18/157,860

(22) Filed: Jan. 23, 2023

(65) Prior Publication Data
US 2024/0246128 A1   Jul. 25, 2024

(51) Int. Cl.
| | | |
|---|---|---|
| B09B 3/35 | (2022.01) |
| B09B 3/45 | (2022.01) |
| B09B 3/65 | (2022.01) |
| B09B 5/00 | (2006.01) |
| B09B 101/25 | (2022.01) |
| B09B 101/77 | (2022.01) |
| B09B 101/85 | (2022.01) |

(52) U.S. Cl.
CPC .............. B09B 3/65 (2022.01); B09B 3/35 (2022.01); B09B 3/45 (2022.01); B09B 5/00 (2013.01); *B09B 2101/25* (2022.01); *B09B 2101/77* (2022.01); *B09B 2101/85* (2022.01)

(58) Field of Classification Search
CPC .... B09B 3/35; B09B 3/45; B09B 3/65; B09B 5/00; B09B 2101/25; B09B 2101/77; B09B 2101/85
See application file for complete search history.

(56) References Cited

U.S. PATENT DOCUMENTS

| | | |
|---|---|---|
| 5,328,562 A | 7/1994 | Rafferty et al. |
| 5,558,281 A | 9/1996 | Bouldin et al. |
| 5,772,134 A | 6/1998 | Bouldin et al. |
| 6,017,475 A | 1/2000 | Cantrell |
| 6,048,458 A * | 4/2000 | Vogt ...................... C12M 45/04 |
| | | 210/603 |
| 7,101,164 B2 | 9/2006 | Bouldin |

(Continued)

FOREIGN PATENT DOCUMENTS

| | | |
|---|---|---|
| EP | 3981519 A1 | 4/2022 |
| EP | 4403273 A1 | 11/2023 |

(Continued)

OTHER PUBLICATIONS

Canadian Office Action for corresponding patent application No. 3,220,328, dated Mar. 31, 2025, 3 pages (not prior art).

(Continued)

*Primary Examiner* — Jacob T Minskey
(74) *Attorney, Agent, or Firm* — Lucian Wayne Beavers; Patterson Intellectual Property Law, PC

(57) ABSTRACT

A process for transforming a stream of MSW material into feedstock for an anaerobic digester and the resulting generation of biogas and other useful products includes the removal of one or more selected chlorine containing components and the retaining of substantially all paper components. At least 70% by mass of the incoming stream of MSW material is hydrolyzed and subsequently directed to the anaerobic digester.

19 Claims, 6 Drawing Sheets

(56) References Cited

U.S. PATENT DOCUMENTS

| | | | |
|---|---|---|---|
| 7,303,160 | B2 | 12/2007 | Bouldin et al. |
| 7,311,504 | B2 | 12/2007 | Bouldin et al. |
| 7,449,330 | B2 | 11/2008 | Bouldin |
| 7,503,759 | B2 | 3/2009 | Bouldin |
| 7,842,486 | B2 | 11/2010 | Bouldin |
| 7,845,620 | B1 | 12/2010 | Bouldin |
| 7,883,331 | B2 | 2/2011 | Bouldin |
| 9,493,796 | B2 | 11/2016 | Medoff et al. |
| 9,555,415 | B2 | 1/2017 | Bouldin et al. |
| 9,562,322 | B1 | 2/2017 | Post |
| 9,700,896 | B1 | 7/2017 | Gitschel |
| 2001/0023749 | A1 | 9/2001 | Nay et al. |
| 2002/0003032 | A1 | 1/2002 | Nay et al. |
| 2006/0024801 | A1 | 2/2006 | Holtzapple et al. |
| 2009/0221814 | A1 | 9/2009 | Pschorn et al. |
| 2010/0065128 | A1 | 3/2010 | Benson et al. |
| 2012/0048975 | A1 | 3/2012 | Gitschel |
| 2013/0206345 | A1 | 8/2013 | Dauser |
| 2013/0236941 | A1 | 9/2013 | Walther et al. |
| 2013/0260433 | A1 | 10/2013 | Zhang |
| 2014/0110069 | A1 | 4/2014 | Rawls et al. |
| 2015/0233053 | A1 | 8/2015 | Stromberg |
| 2018/0037863 | A1 | 2/2018 | Foody et al. |
| 2018/0119035 | A1 | 5/2018 | Tamir |
| 2018/0363017 | A1 | 12/2018 | Tolan et al. |
| 2019/0203134 | A1* | 7/2019 | Joronen ............ C10L 9/12 |
| 2020/0157739 | A1 | 5/2020 | Toll et al. |
| 2020/0332375 | A1 | 10/2020 | Bjrklund et al. |
| 2020/0390108 | A1 | 12/2020 | Wagler et al. |
| 2021/0207185 | A1 | 7/2021 | Birklund et al. |
| 2021/0254281 | A1 | 8/2021 | Melander et al. |
| 2022/0112659 | A1* | 4/2022 | Palmer ............ B09B 3/00 |
| 2022/0145535 | A1 | 5/2022 | Ingolfsson et al. |
| 2023/0149991 | A1 | 5/2023 | Kimura et al. |
| 2023/0406746 | A1 | 12/2023 | Adachi et al. |
| 2024/0246128 | A1 | 7/2024 | Palmer et al. |

FOREIGN PATENT DOCUMENTS

| | | |
|---|---|---|
| WO | 2021234971 A1 | 11/2021 |
| WO | 2022065294 A1 | 3/2022 |
| WO | 2022096406 A1 | 5/2022 |

OTHER PUBLICATIONS

ERDC/CERL TR-08-13, "Hydrothermal Processing of Base Camp Solid Wastes to Allow Onsite Recycling", US Army Corps of Engineers (Sep. 2008)(41 pages).
General Kinematics De-Stoner Air Classifier (undated but admitted to be prior art)(1 page).
A-S-H Submerged Chain Conveyor System (2016)(4 pages).
Steinert NES Non-Ferrous Metal Separator (undated but admitted to be prior art)(6 pages).
SPYDIR-R NRT (undated but admitted to be prior art)(2 pages).
Uni-Shear SR900 Product Overview SSI (undated but admitted to be prior art)(4 pages).
Dual-Shear by SSI (undated but admitted to be prior art)(4 pages).
Fig. 1 of the present application is admitted to be prior art.
Corresponding co-pending U.S. Appl. No. 18/157,858.
Corresponding co-pending U.S. Appl. No. 18/186,989.
H.A. Torbert, D.L. Gebhart and R.R. Busby (2011). New Municipal Solid Waste Processing Technology Reduces Volume and Provides Beneficial Reuse Applications for Soil Improvement and Dust Control, Integrated Waste Management—vol. I, Mr. Sunil Kumar (Ed.), ISBN: 978-953-307-469-6, InTech, Available from: http://www.intechopen.com/books/integrated-waste-management-volume-i/new-municipal-solid-wasteprocessing-technology-reduces-volume-and-provides-beneficial-reuse-applica.
European Search Report for corresponding patent application No. 23212040.2, dated Feb. 5, 2024, 7 pages (not prior art).

\* cited by examiner

ANAEROBIC DIGESTION OF AGGREGATE CELLULOSE PULP

FIELD OF THE DISCLOSURE

The present disclosure relates to transforming waste material, such as household garbage or municipal solid waste (MSW), into biogas and other useful products through an anaerobic digestion process.

DESCRIPTION OF THE PRIOR ART

One prior process of transforming household garbage into useful material is described in U.S. Pat. No. 6,017,475 assigned to Bouldin Corporation, the assignee of the present application, the details of which are incorporated herein by reference. The process described in the '475 patent evolved into the WastAway® process commercialized by Bouldin Corporation.

FIG. 1 of the present disclosure schematically illustrates in process flow chart format one prior art version of the WastAway® process which is indicated by the numeral 10. The waste material was placed in a hopper 12 from which it was fed to a primary shredder 14 in which the waste material was pre-shredded into pre-shredded waste material 16 having a nominal maximum piece size of about 4 inches.

The pre-shredded waste material 16 was then passed through a first ferrous material separator 18 which removed at least a portion of the ferrous material from the pre-shredded waste material. The ferrous metal separator 18 was a belt magnet.

The pre-shredded waste material then passed through a non-ferrous metal separator 20 in which at least a portion of the non-ferrous metal material, such as for example fragments of aluminum cans, was removed from the pre-shredded waste material.

Next the pre-shredded waste material was passed through a fines separator 22 which was configured as a one-quarter inch finger screen. The fines separator 22 was a star screener.

The larger size fraction from the fines separator 22 was then passed through an inerts separator 24 which was configured as an air density separator configured to separate the pre-shredded waste material into a heavier piece stream and a lighter piece stream.

The lighter piece stream from the inerts separator 24 was then passed through a second ferrous material separator 26 which removed at least a portion of the ferrous material from the pre-shredded waste material. The second ferrous metal separator 26 was a belt magnet.

Next the processed pre-shredded waste material 28 went to a secondary shredder 30 which further shredded the processed pre-shredded waste material into a secondarily shredded waste material 32 having a nominal maximum piece size of about one inch.

The secondarily shredded waste material from secondary shredder 30 then went through a hydrolyzer 34 in which the secondarily shredded waste material was hydrolyzed under pressure greater that ambient pressure to create an aggregate cellulose pulp 36. The hydrolyzer 34 was constructed and operated generally in the manner described in U.S. Pat. No. 6,017,475.

The aggregate cellulose pulp 36 was then passed through a dryer 38 and a pelletizer 40 in which it was formed into pellets schematically indicated at 42. In the process 10 of FIG. 1, wherein the primary shredder 14 pre-shredded the waste material into pre-shredded waste material 16 having a nominal maximum piece size of about 4 inches, many common components of the waste material such as ferrous and non-ferrous cans, plastic bottles, and the like, were shredded into pieces in the primary shredder 14, and thus subsequent removal of those components from the stream of pre-shredded waste material involved the removal of these pieces.

SUMMARY OF THE DISCLOSURE

The present disclosure provides a process for converting MSW into biogas and other useful products. In part the present disclosure provides a number of improvements on the prior art WastAway process described above which are directed to providing an improved feedstock for an anaerobic digester.

The present disclosure also relates to apparatus and processes which maximize the portion of an incoming MSW stream which can be directed to the anaerobic digester, thus reducing the amount of material from the incoming MSW stream which requires disposal in a landfill or by other disposal means. This is contrasted to many previous proposals for anaerobic digestion of waste material in which only selected types of organic material are separated from the MSW stream for use in the anaerobic digestion process. By the present processes at least 70%, preferably at least 75%, and more preferably at least 80%, by mass of the incoming stream of MSW material may be directed into the hydrolyzer and converted to aggregate cellulose material which is then fed to the anaerobic digester. Digestate left over from the anaerobic digestion process may then be converted into fuel material which can be burned for further energy recovery and/or converted into other useful products. This greatly reduces the portion of the incoming MSW stream which ultimately winds up in a landfill.

In one embodiment a process of transforming a stream of MSW material into feedstock for the anaerobic digester and the resulting generation of biogas and other useful products may be described as:

(a) receiving a stream of municipal solid waste (MSW) material;

(b) removing one or more selected chlorine containing components from the stream of MSW material to reduce a relative chlorine content of the stream of MSW material;

(c) retaining in the stream of MSW material substantially all paper components so as to maintain a relative carbon content of the stream of MSW material;

(d) removing at least a majority of all metal and inorganic components from the stream of MSW material;

(e) after steps (b), (c) and (d), receiving in a hydrolyzer the stream of MSW material including at least 70% by mass of the stream of MSW material received in step (a);

(f) hydrolyzing the stream of MSW material in the hydrolyzer by exposing the stream of MSW material to pressurized steam so that the steam crosses cell membranes of organic material contained in the stream of MSW material;

(g) discharging the stream of MSW material from the hydrolyzer to a reduced pressure zone so that a rapid decompression of the stream of MSW material ruptures cell walls of the organic material thereby forming an aggregate cellulose pulp having an expanded surface area; and (h) receiving the stream of MSW material including the aggregate cellulose pulp in an anaerobic digester and digesting the stream of MSW material to generate a biogas, the stream of MSW material received in the anaerobic digester including at least 70% by mass of the stream of MSW material received in step (a).

Numerous objects, features and advantages of the present invention will be readily apparent to those skilled in the art upon a reading of the following disclosure when taken in conjunction with the accompanying drawings.

DETAILED DESCRIPTION

Figure 1:
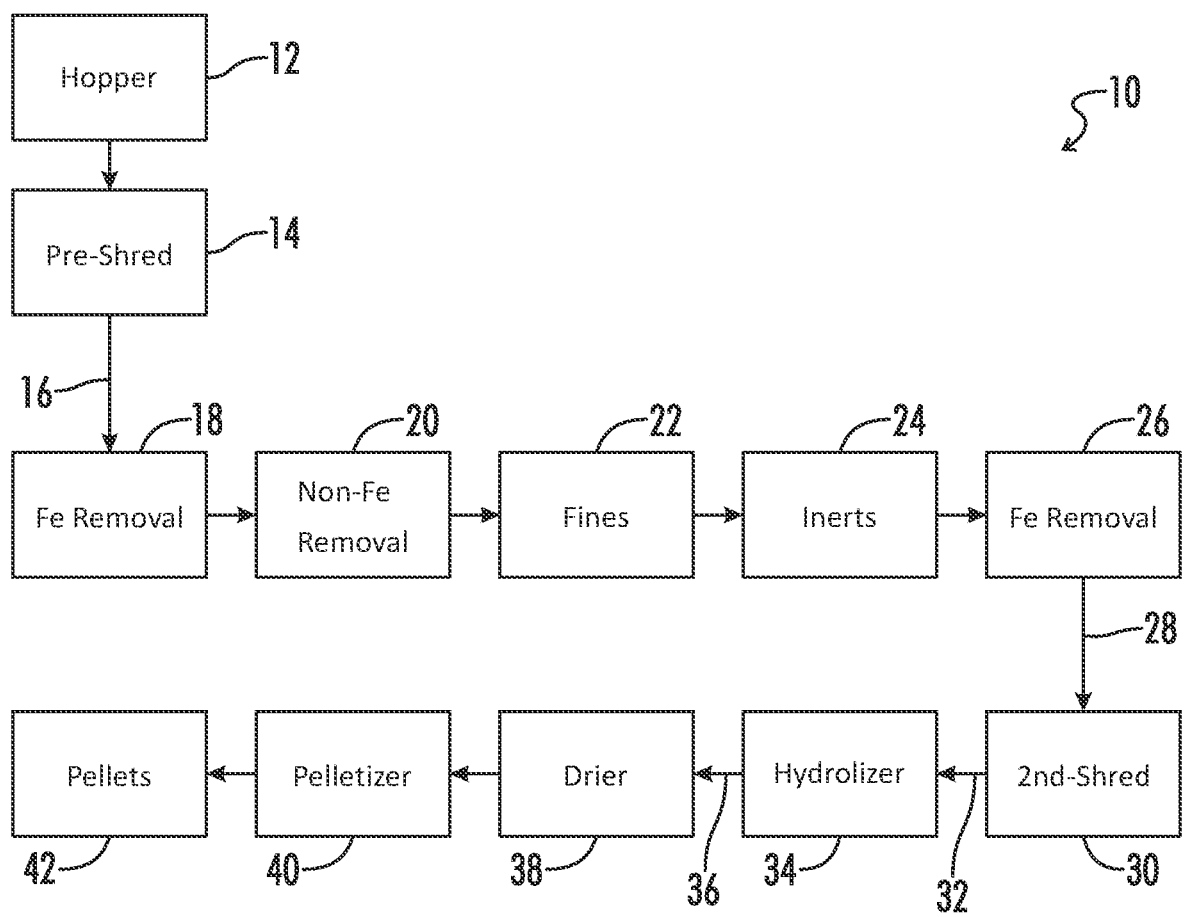
FIG. 1 is a flow chart for a prior art process.
Figure 2:
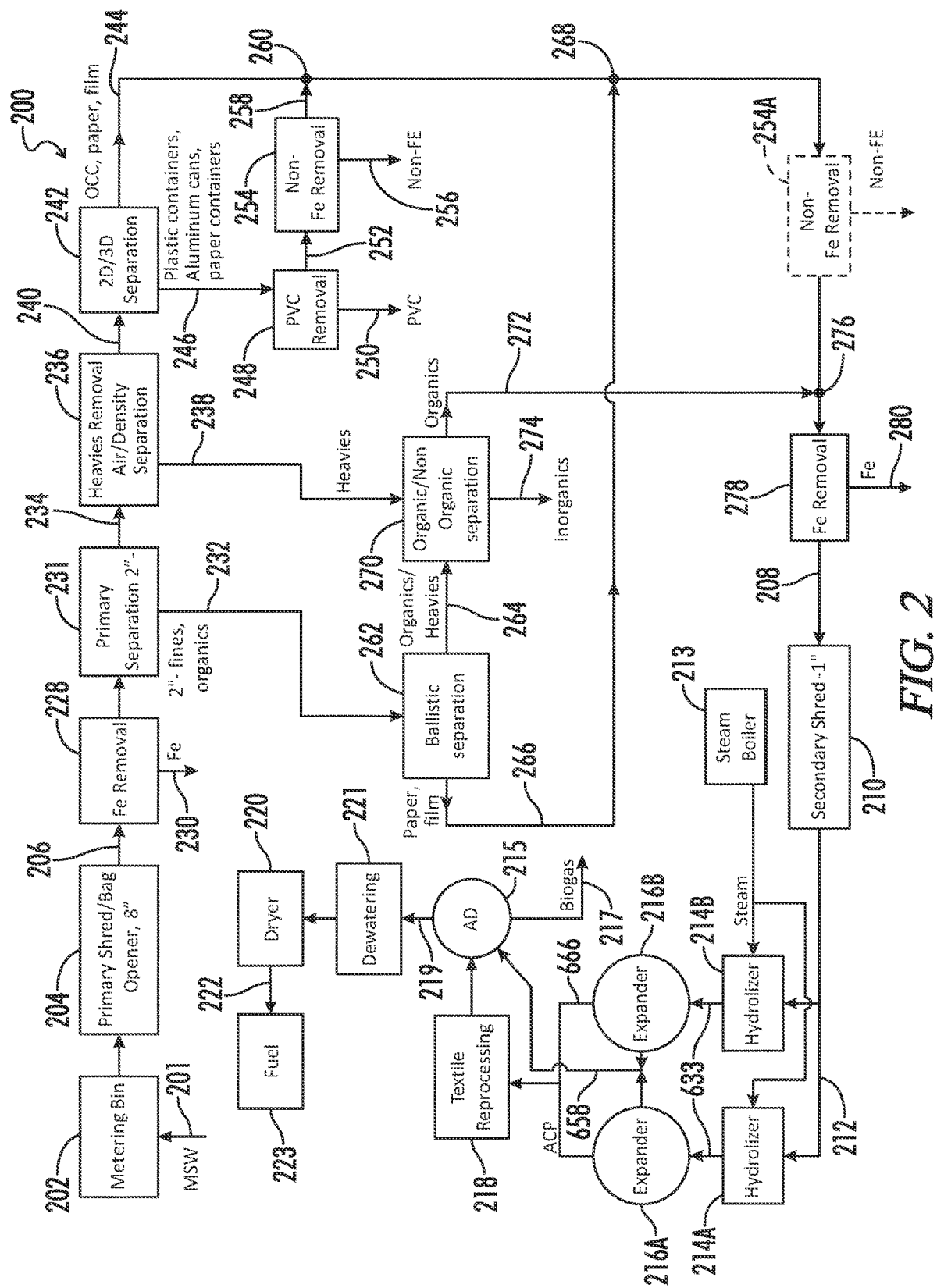
FIG. 2 is a flow chart for a first embodiment of an improved process for the hydrolyzing of MSW material to provide a feedstock for anaerobic digestion.

Pre-Hydrolyzer Processing of the MSW Stream:

A first embodiment of the improved processes disclosed herein is schematically illustrated in FIG. 2 and designated by the numeral 200. The process 200 is a process for transforming waste material such as household garbage or municipal solid waste (MSW) into biogas via an anaerobic digestion process. Additionally, digestate left over from the anaerobic digestion process may be transformed into a useful material such as a pelletized cellulose material such as generally described in U.S. Pat. No. 6,017,475 which is incorporated herein by reference. The material also may simply be dried and used as fuel without pelletizing. That material may be burned as fuel, or in turn may be transformed into other useful products.

The process 200 begins by providing a quantity of this waste material into a metering bin 202. The incoming MSW stream is indicated at 201, and in one embodiment that incoming MSW stream is an unsorted collection of solid waste material collected from homes and other customers of a typical municipal trash collection system. The metering bin 202 moves the waste material at a relatively constant flow rate into a primary shredder 204.

The primary shredder 204 is designed to pre-shred the waste material into pre-shredded waste material 206 having a nominal maximum piece size of at least about 6 inches, more preferably having a nominal maximum piece size of at least about 7 inches, even more preferably having a nominal maximum piece size of at least about 8 inches, and most preferably a nominal maximum piece size of about 8 inches. The primary shredder 204 also functions as a bag opener to tear open the typical plastic garbage bags in which much household garbage is bagged for municipal garbage collection. The primary shredder 204 may for example be of the type generically referred to as a "low speed high torque" shredder.

As used herein the term "nominal maximum piece size" in the context of a shredder refers to the nominal dimension to which a given shredder is designed reduce larger articles. It will be understood that many shredded fragments may be smaller than the "nominal maximum piece size" and a few may even be a bit larger than the "nominal maximum piece size". The "nominal maximum piece size" is a determined by the physical design of the shredder. Thus, commercial shredders are often referred to as a two-inch shredder, or a four-inch shredder, or an eight inch shredder, with reference to their "nominal maximum piece size". Similarly, the term "nominal maximum piece size" in the context of a separator refers to the nominal maximum dimension of the smallest pieces that are allowed to pass into the smaller piece stream from the separator.

The pre-shredded waste material 206 is then put through a sequence of processing steps design to at least partially remove one or more selected material components, thereby providing a processed pre-shredded waste material 208 which then passes through a secondary shredder 210.

The secondary shredder 210 is designed to secondarily shred the processed pre-shredded waste material 208 into a secondarily shredded waste material 212 having a nominal maximum piece size of no greater than about two inches and more preferably a nominal maximum piece size of no greater than about one inch. The secondary shredder 210 may for example be of the type generically referred to as a "low speed high torque" shredder.

The secondarily shredded waste material 212 then passes through either of two parallel hydrolyzers 214A and 214B and associated expanders 216A and 216B. Although two parallel hydrolyzers 214A and 214B are shown, a single hydrolyzer 214, or more than two hydrolyzers 214 may be used.

The output from the expanders 216A and 216B then flows through a textile reprocessing station 218 and then to the anaerobic digester 215. In a manner further described below the anaerobic digester 215 transforms the aggregate cellulose pulp material from the hydrolyzers 214A and 214B into a biogas stream 217 and a digestate stream 219.

The digestate stream 219 then may flow through a dewatering station 221 followed by a dryer 220. From the dryer 220 the dried digestate material 222 may be used as fuel 223 to further recover energy from the MSW material, or the dried digestate material 222 may be transformed into other useful articles.

The hydrolyzers 214A and 214B hydrolyze the secondarily shredded waste material 212 under pressure greater than ambient pressure to create an aggregate cellulose pulp in the manner generally described in U.S. Pat. No. 6,017,475. Other details of suitable hydrolyzer constructions are shown in U.S. Pat. Nos. 7,303,160; 7,883,331; and 9,555,415; the details of which are incorporated herein by reference. The textile reprocessing station 218 may be constructed in accordance with the teachings of U.S. Pat. No. 9,562,322 the details of which are incorporated herein by reference.

The various processing steps of process 200 between the primary shredder 204 and the secondary shredder 210 are designed to remove ferrous and non-ferrous metals, and polyvinylchloride (PVC) plastics from the material stream for recycling. Also, inorganic materials such as rocks, glass and other inert materials are removed. In addition to better capturing valuable materials for recycling, the quality of the remaining material stream is improved as a feed material for the hydrolyzers. This results in an aggregate cellulose pulp from the hydrolyzers which is in turn an improved feedstock for the anaerobic digester.

These intermediate processing steps may begin by passing the pre-shredded waste material 206 from primary shredder 204 through a ferrous material separator 228 which removes at least a portion of the ferrous material present in the pre-shredded waste material 206 for recycling. The removed ferrous material is indicated at 230. The ferrous material separator 228 may for example be of the type generically referred to as a "drum magnet" separator.

Next the pre-shredded waste material 206 passes through a primary separator 231 which separates the pre-shredded waste material 206 into a smaller piece stream 232 and a larger piece stream 234. The smaller piece stream 232 is often referred to as a "fines" stream. The primary separator 231 is constructed such that the smaller piece stream 232 has a nominal maximum piece size in a range of from about 1 inch to about 3 inches, and preferably the nominal maximum piece size is about 2 inches. The primary separator 231 may for example be of the type generically referred to as a "disc screen" separator.

The larger piece stream 234 goes to a second separator 236 which separates the larger piece stream 234 into a heavier piece stream 238 and a lighter piece stream 240. The second separator 236 may for example be of the type generically referred to as an air/density separator.

The lighter piece stream 240 is then passed to a 2D/3D separator 242 which separates the lighter piece stream 240 into a stream 244 of substantially two-dimensional pieces and a stream 246 of substantially three-dimensional pieces. The substantially two-dimensional pieces may for example include cardboard, office paper, plastic film, and the like. The substantially three-dimensional pieces may for example include plastic containers, aluminum cans, paper box containers, and the like. The 2D/3D separator 242 may for example be of the type generically referred to as a "disc screen" separator.

The stream 246 of substantially three-dimensional pieces goes to a PVC separator 248 which removes PVC pieces from the stream 246. The PVC separator may 248 for example be of the type generically referred to as an optical sorter which analyzes electromagnetic energy reflected from the pieces to identify those pieces made of PVC, and then sorts the PVC pieces from the other components of the stream 246 of substantially three-dimensional pieces. The PVC pieces removed from the stream are indicated at 250. That PVC material 250 will typically be bundled and sold as recycled material. It is noted that other selected plastic containers could also be removed by an optical sorter at this position in the process.

The remaining substantially three-dimensional pieces exit the PVC separator 248 in stream 252 and pass to a non-ferrous metal separator 254. Non-ferrous three-dimensional objects, which may for example be aluminum cans, are removed as indicated at 256. The non-ferrous articles will also typically be sold as recycled material. The non-ferrous metal separator 254 may for example be of the type generically referred to as an "eddy current" separator. It is noted that an alternative location for the non-ferrous metal separator 254 is shown in dashed lines and indicated by the number 254A.

The remainder 258 of the substantially three-dimensional pieces are rejoined with the stream of substantially two-dimensional pieces at junction 260. It is noted that by separating out the stream 244 of substantially two-dimensional pieces the sorting performed by PVC sorter 248 and non-ferrous metal sorter 254 is made much more efficient because the two-dimensional pieces are no longer present to clog these sorters or to cover up the substantially three-dimensional pieces which are being sorted.

The smaller piece stream 232 from primary separator 231 passes into a third separator 262 which separates the smaller piece stream 232 into a heavier piece stream 264 and a lighter piece stream 266. The lighter piece stream 266 rejoins the processed substantially two-dimensional pieces and substantially three-dimensional pieces at junction 268. The heavier piece stream 264 flows into an organic/inorganic separator 270. The heavier piece stream 238 from second separator 236 also flows into the organic/inorganic separator 270. The organic/inorganic separator 270 separates the two heavier piece streams 264 and 238 into an organics stream 272 comprising primarily organic material and an inorganics stream 274 comprising primarily inorganic material. The inorganics stream 274 typically is made up of rocks and other such debris which is discarded. The organics stream 272 includes material such as food waste which is combined with the other processed components at junction 276.

Figure 4:
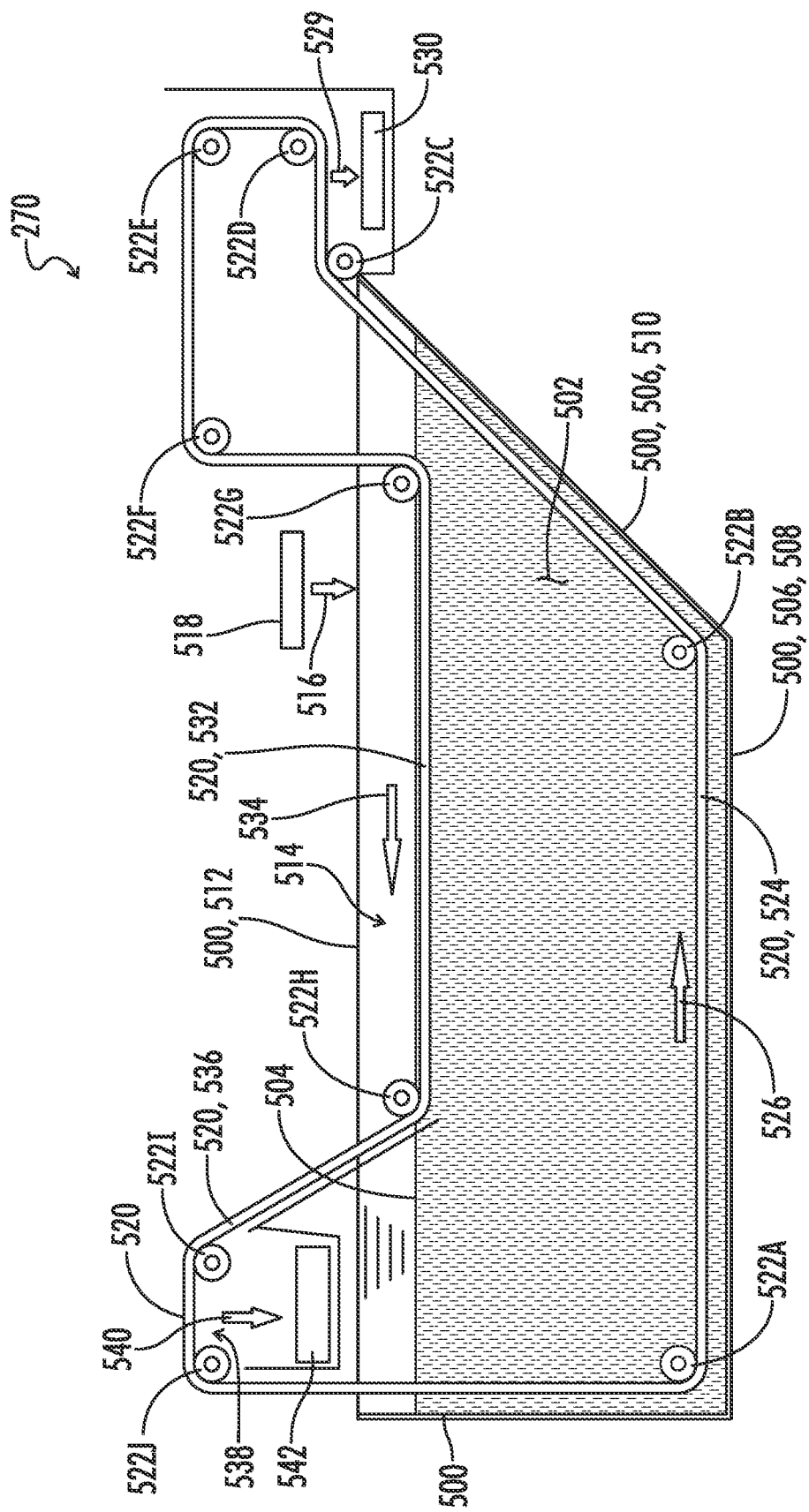
FIG. 4 is a schematic illustration of a water bath separator for separating organic material from inorganic material.

The organic/inorganic separator 270 may for example be a water bath separator configured such that organic materials float to the surface of the water bath and inorganic materials sink to the bottom of the water bath. The details of construction of one example of such a water bath separator are shown in FIG. 4 and further described below.

The processed pre-shredded materials 208 flowing from junction 276 toward the secondary shredder 210 include the stream 244 of substantially two-dimensional pieces, the stream 258 of remaining substantially three-dimensional pieces, the lighter piece stream 266 and the organics stream 272.

In one final processing step a second ferrous material separator 278 immediately upstream of the secondary shredder 210 separates at least a portion of any remaining ferrous material from the material stream 208 otherwise entering the secondary shredder 210. The removed ferrous material is indicated at 280.

FIG. 3 Embodiment

Figure 3:
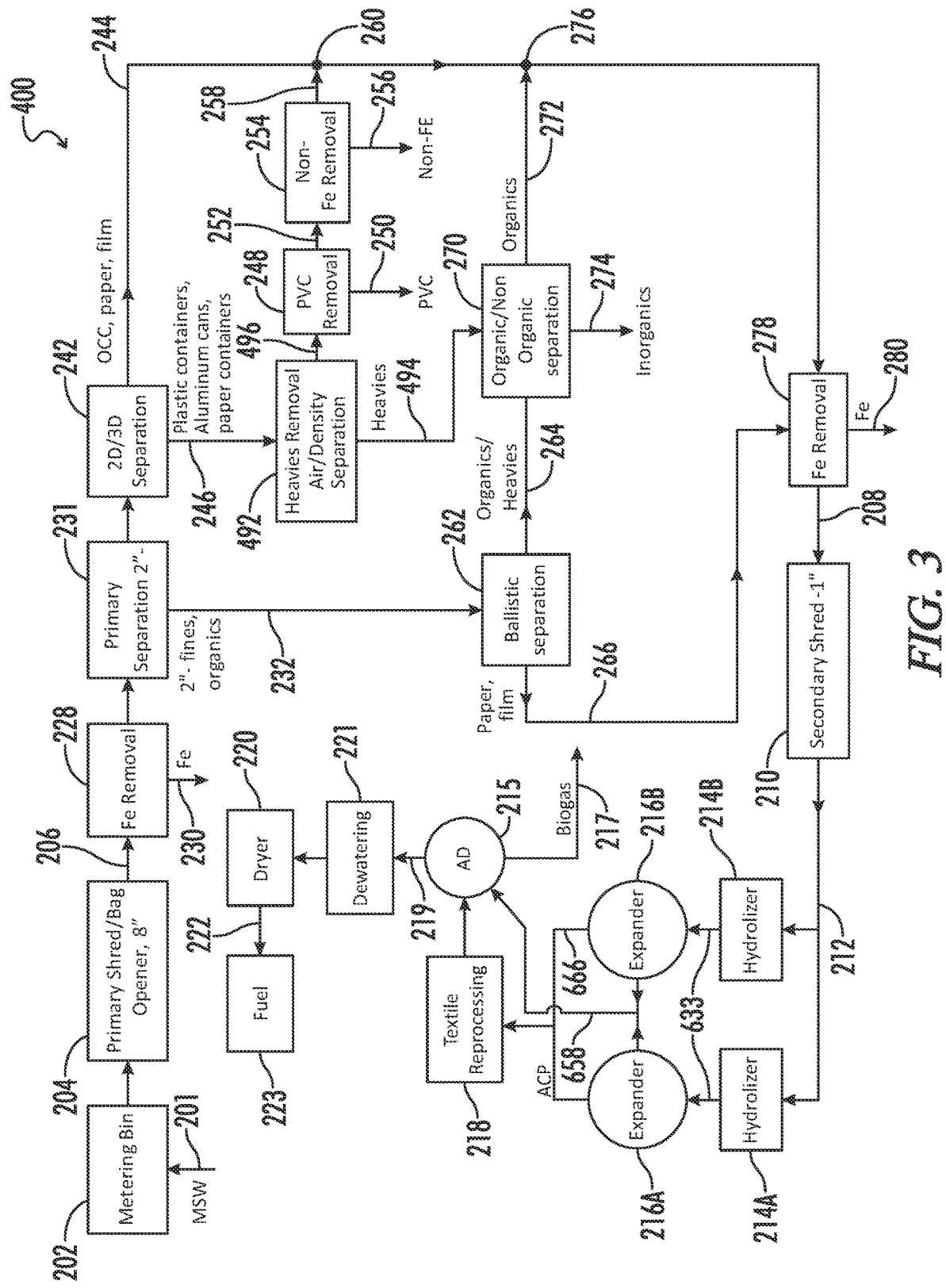
FIG. 3 is a flow chart for a second embodiment of an improved process for the hydrolyzing of MSW material to provide a feedstock for anaerobic digestion.

A second embodiment of the improved processes disclosed herein is schematically illustrated in FIG. 3 and designated by the numeral 400. The process 400 is in large part similar to the process 200 and like steps are identified by the same numbers used in FIG. 2 and their descriptions will not be repeated.

The primary difference in the process 400 is that the second separator 236 of FIG. 2 between the primary separator 231 and the 2D/3D separator 242 has been removed, and a similar second separator 492 has been placed between the 2D/3D separator 242 and the organic/inorganic separator 270. The second separator 492 separates the stream 246 of substantially three-dimensional pieces into a heavier piece stream 494 and a lighter piece stream 496. The heavier piece stream 494 flows to the organic/inorganic separator 270 where it is treated along with the heavier piece stream 264 from the third separator 262. The lighter piece stream 496 which includes the bulk of the stream of substantially three-dimensional pieces flows to the PVC separator 248 where it is treated as previously described. The second separator 492 may for example be of the type generically referred to as an air/density separator.

The Water Bath Separator of FIG. 4

One example of the water bath separator 270 is schematically shown in FIG. 4. Separator 270 includes a flotation tank 500 configured to receive a volume of water 502 filling the tank 500 to a water surface level 504. The tank 500 includes a tank bottom 506 including a horizontal portion 508 and a ramp portion 510.

The tank 500 may have an open top 512 defining a tank inlet 514 for receiving a mixture 516 of less dense organic material and more dense inorganic material from one or more infeed conveyors 518. In the embodiment of FIG. 2 the one or more infeed conveyors 518 may carry the incoming streams 238 and 264. In the embodiment of FIG. 3 the one or more infeed conveyors 518 may carry the incoming streams 264 and 494. The operating principle of the water bath separator 270 is that the less dense organic material tends to float on or near the water surface 504, and the more dense inorganic material tends to sink to the tank bottom 506, 508.

An endless conveyor 520, which may be a chain and flight type conveyor or any other suitable type conveyor, is received in the tank 500 and runs about a plurality of roller guides 522A-522J. The conveyor 520 includes a lower conveyor run 524 extending from roller guide 522A to roller guide 522D and runs in the direction generally indicated at 526. The lower conveyor run 524 extends generally parallel to and closely adjacent to the tank bottom 506 so that the flights of the chain and flight conveyor push accumulated more dense inorganic material from left to right in FIG. 4 across the horizontal portion 508 of tank bottom then up the ramp portion 510 of tank bottom. After the lower conveyor run passes roller guide 522C the conveyor passes over a downwardly open inorganic material discharge outlet 528 that allows the inorganic material, generally indicated at 529, to drop out of the conveyor 520 onto an inorganics discharge conveyor 530.

The endless conveyor 520 further includes an upper conveyor run 532 extending from roller guide 522G to roller guide 522J and moving generally in the direction indicated by arrow 534. Thus, with reference to FIG. 4 the endless conveyor 520 runs in a loop in a counterclockwise direction. The upper conveyor run 532 extends generally parallel to and closely adjacent to the water surface 504, so that the flights of the chain and flight conveyor push accumulated less dense organic material from right to left in FIG. 4 across the water surface 504 then up an upper conveyor ramp portion 536. After the upper conveyor run 532 passes roller guide 522I the conveyor passes over a downwardly open organic material discharge outlet 538 that allows the organic material, generally indicated at 540, to drop out of the conveyor 520 onto an organics discharge conveyor 542.

Figure 5:
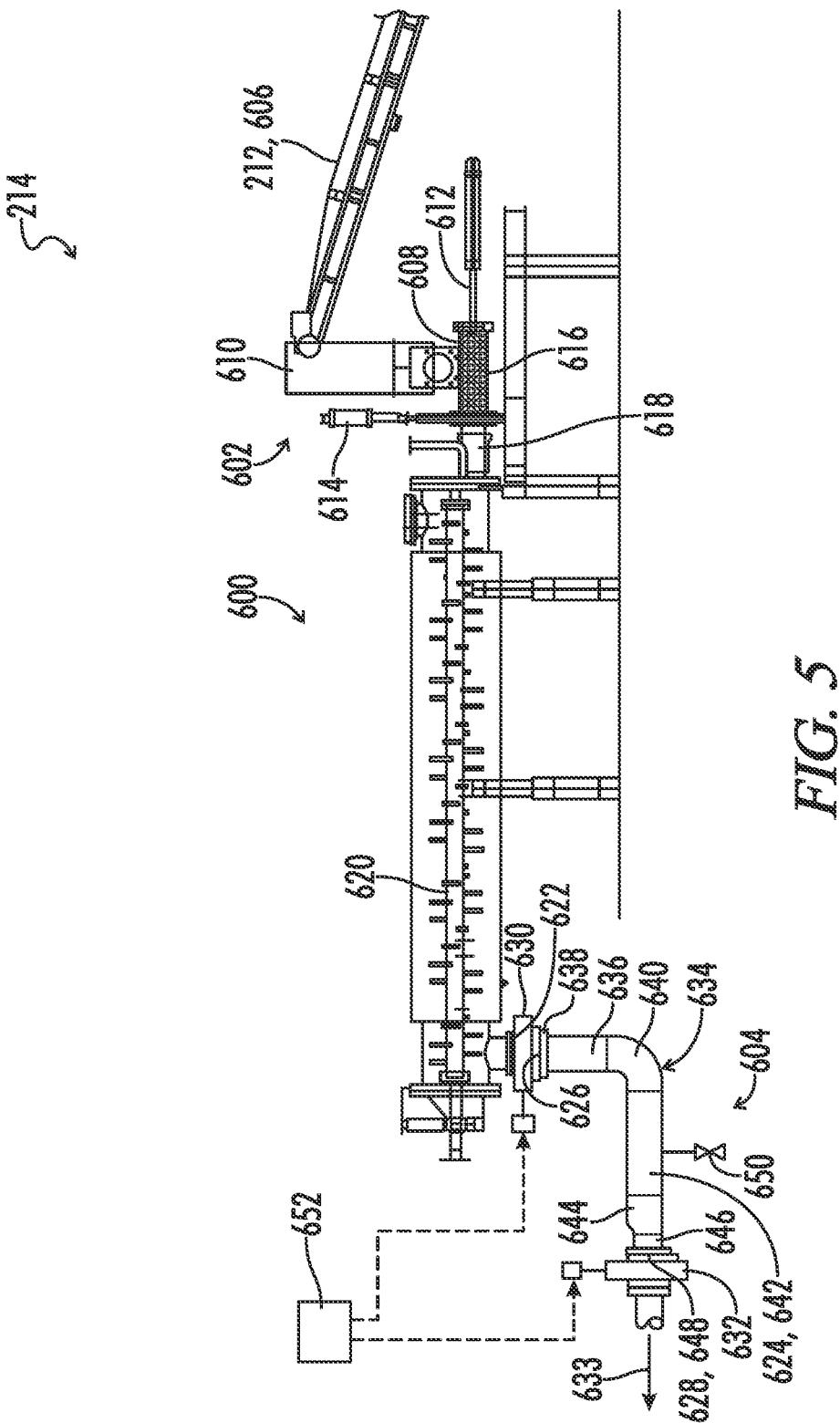
FIG. 5 schematically shows the hydrolyzer and its infeed and outfeed assemblies.

The Hydrolyzer:

FIG. 5 schematically illustrates the hydrolyzer 214 and certain improvements therein which further improve the production of an aggregate cellulose material which is especially suitable for the subsequent anaerobic digestion process.

The hydrolyzer 214 generally includes a hydrolyzer vessel 600, and infeed assembly 602 and an outfeed assembly 604. A conveyor 606 may convey secondary shredded material from the secondary shredder 210 to the infeed assembly 602.

The infeed assembly 602 may be constructed in accordance with any one of the following U.S. Pat. Nos. 7,833,332; 7,503,759; and 7,101,164, the details of which are incorporated herein by reference. The infeed assembly 602 includes an infeed chamber 608 which receives shredded material from an inlet chute 610. A ram 612 compresses the shredded material against a movable gate 614 to form a plug 616 of compressed shredded material which is subsequently pushed through the gate 614 by the ram 612 into the hydrolyzer vessel 600. The plug is first received in a preheating chamber 618 in which the material is subjected to pressurized steam heat. Steam is provided to the hydrolyzer 214 from a steam boiler 213 (see FIG. 2). As the shredded material moves through the hydrolyzer vessel 600 it is agitated by a rotating mixer shaft 620.

The hydrolyzer vessel 600 is sized and configured to expose the stream of shredded MSW material to steam at a pressure in a range of from 120 psi to 130 psi and a corresponding temperature in a range of from 300 degrees F. to 400 degrees F. for a time interval of from 10 to 30 minutes so that the steam crosses cell membranes of organic material contained in the stream of shredded MSW material. Alternatively, the hydrolyzer vessel 600 may be described as being sized and configured to expose the stream of shredded MSW material to steam at a pressure of at least 120 psi and a temperature of at least 300 degrees F. for a time interval of at least 10 minutes.

The outfeed assembly 604 is configured to discharge a controlled portion of the stream of MSW material from a hydrolyzer outlet 622 of the hydrolyzer vessel 600 to a reduced pressure zone in the expanders 216A, 216B so that a rapid decompression of the stream of MSW material ruptures cell walls of the organic material thereby forming an aggregate cellulose pulp having an expanded surface area.

The outfeed assembly includes an intermediate pressure chamber 624 having a pressure chamber inlet 626 and a pressure chamber outlet 628. A pressure chamber inlet valve 630 selectively communicates the hydrolyzer outlet 622 with the pressure chamber inlet 626. The inlet valve 630 has an inlet valve cross-sectional area defined in a fully open position of the inlet valve 630. A pressure chamber outlet valve 632 selectively communicates the pressure chamber outlet 628 with the expansion chamber 216. The pressure chamber outlet valve 632 has an outlet valve cross-sectional area defined in a fully open position of the pressure chamber outlet valve 632. The valves 630 and 632 may for example be quick acting pneumatically powered gate valves which may be fully opened in no less than 2.0 seconds.

The outlet valve cross-sectional area is smaller than the inlet valve cross-sectional area. In one example the pressure chamber inlet valve 630 may be a ten inch nominal diameter gate valve and the pressure chamber outlet valve 632 may be a six inch nominal diameter gate valve. The outlet valve cross-sectional area of pressure chamber outlet valve 632 may less than 50%, and more preferably less than 40%, of the inlet valve cross-sectional area of the pressure chamber inlet valve 630. This reduction in size of the outlet as compared to the inlet of the intermediate pressure chamber 624, in conjunction with the configuration of the intermediate pressure chamber 624 may result in the creation of a venturi effect adjacent the outlet valve 632 and a rapid pressure drop across the outlet valve 632 as the hydrolyzed material explodes into the expansion chamber 216. The venturi will provide a high pressure zone right before the outlet valve 632 thus maximizing the rapid pressure drop as the material moves from the intermediate pressure chamber 624 into the expansion chamber 216. In one example the pressure chamber outlet valve 632 may be a six inch nominal diameter gate valve having a fully open cross-sectional area less than 30 square inches. A conduit 633 communicates the outlet valve 632 with an inlet 635 (see FIG. 6) of the expansion chamber 216.

In one embodiment the intermediate pressure chamber 624 is configured as a flanged pressure vessel 634, the pressure chamber inlet 626 being a flanged pressure chamber inlet 626, and the pressure chamber outlet 628 being a flanged pressure chamber outlet 628 of smaller diameter than the flanged pressure chamber inlet. For example, with the exemplary inlet and outlet valves 630 and 632 being ten inch and six inch nominal diameter gate valves, respectively, the flanged pressure vessel 634 may be constructed to include a vertical inlet portion 636 formed of ten inch diameter pipe with an upwardly open inlet flange 638 defining the flanged inlet 626. At the bottom of the inlet portion 636 a ten inch diameter pipe elbow 640 joins the inlet portion 636 with a substantially horizontally oriented outlet portion 642 formed of ten inch diameter pipe which necks down via an eccentric reducing swage 644 to a six inch nominal diameter pipe portion 646 to which an outlet flange 648 is attached to define the flanged outlet 628. The swage 644 may also be referred to as a reduced diameter neck 644.

The hydrolyzer outlet 622 may be arranged directly above the upwardly open flanged inlet 626 so that hydrolyzed material under pressure can fall at least in part by gravity downward through the flanged pressure chamber inlet 626 into the intermediate pressure chamber 624. The hydrolyzed material will also be aided in its flow into the intermediate pressure chamber 624 by the pressure of the steam in the hydrolyzer 214.

The flanged pressure vessel 634 may be described as an elongated pressure vessel 634 having the pressure chamber inlet 626 at a first end of the elongated pressure vessel 634 and having the pressure chamber outlet 628 at a second end of the elongated pressure vessel 634, wherein the elongated pressure vessel 634 has a decreased cross-sectional area formed by the reducing swage 644 adjacent the second end as compared to the first end, thereby forming a venturi adjacent the pressure chamber outlet 628. The elongated pressure vessel 634 may be described as including an inlet portion 636 adjacent the pressure chamber inlet 626, the inlet portion 636 having an annular cross-section and being substantially vertically oriented such that the pressure chamber inlet 626 is upwardly open. The elongated pressure vessel 634 may be further described as including an outlet portion 646 adjacent the pressure chamber outlet 628, the outlet portion 646 having an annular cross-section and being substantially horizontally oriented such that the pressure chamber outlet 628 is laterally open.

A drain 650 may be connected to the intermediate pressure chamber 624 so that condensate may be drained from the intermediate pressure chamber 624 when the hydrolyzer outfeed system 604 is out of operation.

The Expansion Chamber

Figure 6:
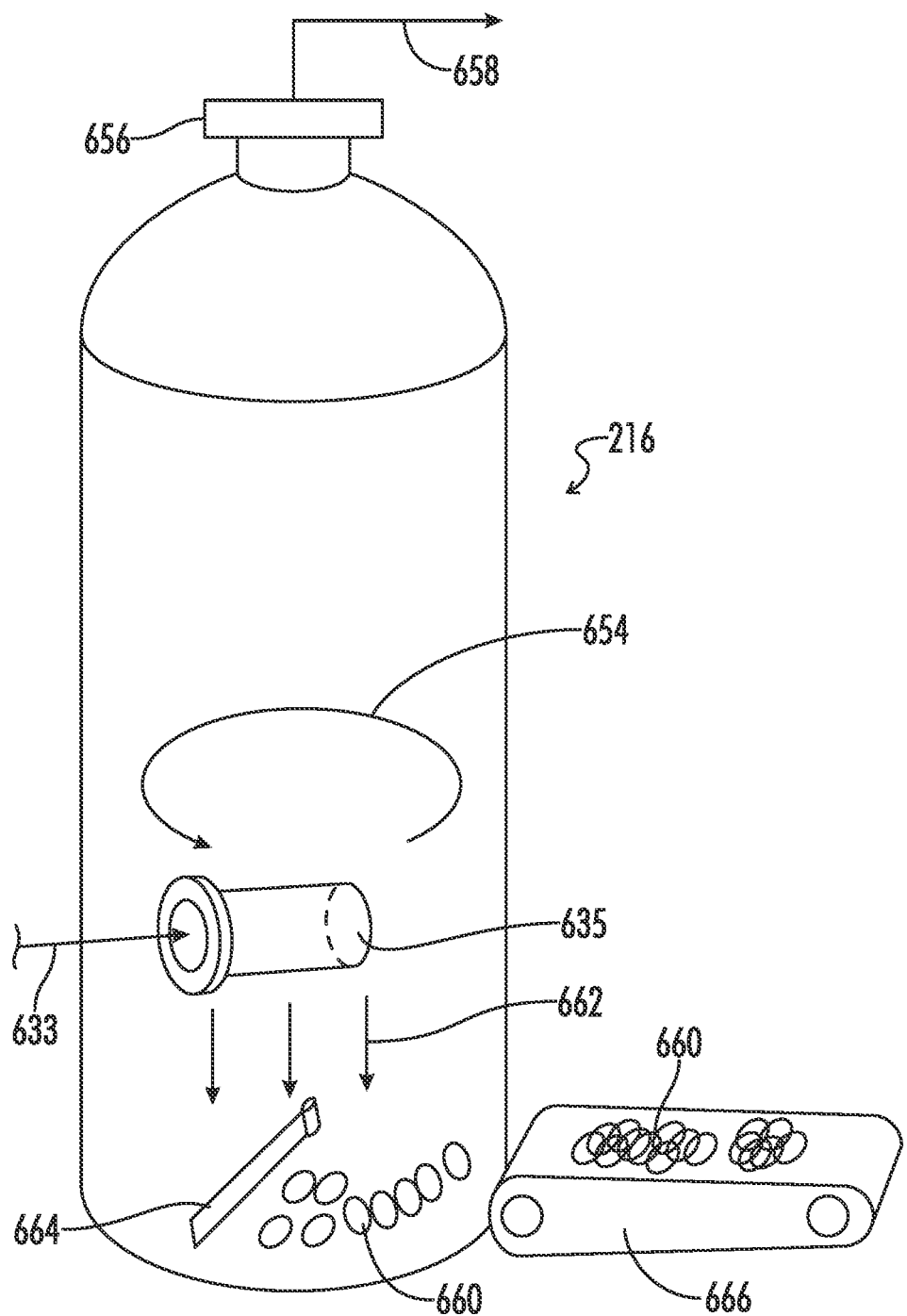
FIG. 6 schematically shows the expansion chamber.

Further details of the expansion chamber 216 are schematically shown in FIG. 6. The expansion chamber 216 may be constructed as an elongated vertically oriented cylindrical structure. The inlet 635 is preferably oriented somewhat tangentially to the circular cross-section of the expansion chamber so that as the hydrolyzed material explodes into the expansion chamber 216 a somewhat spiraling flow of material suspended in the air is created as indicated at 654. A fan 656 may be provided in the top of the expansion chamber to pull air and suspended steam condensate out of the expansion chamber into a condensate return line 658. The condensate return line 658 directs the stream of steam condensate to the anaerobic digester 215 as schematically shown in FIG. 2 so that any organic material carried in that stream of steam condensate may be included in the anaerobic digestion process.

As previously noted, rapid decompression of the stream of MSW material exiting the outlet valve 632 into the expansion chamber 216 ruptures cell walls of the organic material thereby forming an aggregate cellulose pulp having an expanded surface area. The aggregate cellulose pulp is schematically indicated as 660 in FIG. 6. The aggregate cellulose pulp (ACP) 660 falls by gravity out of the swirling mass at 654 downwardly to the bottom of the expansion chamber 216 as indicated by downward arrows 662.

A scraper 664 located in the lower portion of the expansion chamber 216 scrapes the ACP 660 onto a conveyor 666 which carries the ACP to the textile reprocessing station 218 as schematically shown in FIG. 2. By the present processes at least 70%, preferably at least 75%, and more preferably at least 80%, by mass of the incoming stream of MSW material may be directed into the hydrolyzer 214 and converted to aggregate cellulose material which is then fed to the anaerobic digester 215.

With this arrangement the expansion chamber 216 operates somewhat as a large cyclone with the steam condensate and air being exhausted from the top center of the vessel by the fan 656, and with the bursts of exploding aggregate cellulose pulp 660 being injected tangentially into the swirling mass via the tangential inlet 635. The heavier solid aggregate cellulose pulp 660 drops to the bottom and is removed separately from the air and entrained droplets of condensate and smaller lighter particulate material which exits via the condensate return line 658.

The Hydrolyzing Process

The relative sizes of the hydrolyzer 600, the intermediate pressure chamber 624 and the expansion chamber 216 are important to the proper operation of the described processes.

The hydrolyzer 600 may have a hydrolyzer volume at least 20 times as great as a pressure chamber volume of the intermediate pressure chamber 624. Preferably the hydrolyzer volume is at least 30 times as great as the pressure chamber volume, and more preferably the hydrolyzer volume is at least 40 times as great as the pressure chamber volume. The significance of the relative volumes of the hydrolyzer 600 and the intermediate expansion chamber 604 is that the intermediate expansion chamber 604 should be small enough that it can be fully charged with steam and material from the hydrolyzer 600 and be able to reach full pressure to maximize the subsequent pressure differential when the intermediate pressure chamber is discharged into the expansion chamber 216.

Also important is the relative size of the steam boiler 213 (see FIG. 2) which supplies steam to the hydrolyzer 214. The steam boiler 213 must be able to supply enough steam into the hydrolyzer 214 so that the intermediate expansion chamber 604 is kept under a pressure as close as possible to that of the hydrolyzer 214 when the inlet valve 630 is opened. For example, if the steam pressure in the hydrolyzer 214 is at least 120 psi, the material in the intermediate pressure vessel should be maintained at a pressure of at least 110 psi when the inlet valve 630 is opened.

The expansion chamber 216 may have an expansion chamber volume at least 400 times as great as the pressure chamber volume. Preferably the expansion chamber volume is at least 700 times as great as the pressure chamber volume, and more preferably the expansion chamber volume is at least 1000 times as great as the pressure chamber volume. The significance of the relative volumes of the intermediate pressure chamber 624 and the expansion chamber 216 is to allow substantially complete expansion of any water vapor contained in the cellular structure of the cellulose material in the intermediate expansion chamber 624 into steam thus rupturing those cellular walls as the cellulose material explodes into the expansion chamber 216.

The pressure chamber volume may be in a range of from 1 to 5 cubic feet. In one example the pressure chamber volume may be approximately 1.9 cubic feet, the hydrolyzer volume may be approximately 90 cubic feet, and the expansion chamber volume may be approximately 1,300 cubic feet. In this example the intermediate expansion chamber 624 is able to be filled with hydrolyzed material from hydrolyzer 600 and reach pressure equalization with the hydrolyzer 600 in about 2 seconds. Theoretically to achieve complete expansion of water into steam when the hydrolyzed material from intermediate pressure chamber 624 explodes into the expansion chamber 216 the ratio of the expansion chamber volume to intermediate pressure chamber volume should be at least 1700 because water increases in volume by approximately 1700 times at standard pressure and temperature. In the example stated above the ratio of the expansion chamber volume to intermediate pressure chamber volume is only about 43% of that ideal ratio, but it has been observed that this is sufficient to fully expand the aggregate cellulose material. Furthermore, the momentary pressure increase experienced in the expansion chamber 216 does not negatively affect the process. Actually, the temporary pressure increase may assist the emptying of the expansion chamber 216.

A controller 652 may be operatively connected to the pressure chamber inlet valve 630 and the pressure chamber outlet valve 632 as indicated by dash lines in FIG. 5. The controller 652 may be configured to control the operation of those valves 630 and 632 so as to maintain the pressure within the hydrolyzer 600 while allowing the hydrolyzed material to flow from the hydrolyzer 600 into the expansion chamber 216 is a series of rapid bursts of hydrolyzed material. The controller 652 may be configured to:

(a) open the pressure chamber inlet valve 630 while the pressure chamber outlet valve 632 is closed and thereby charge the intermediate pressure chamber 624 with hydrolyzed material under pressure;

(b) close the pressure chamber inlet valve 630 and trap the hydrolyzed material under pressure in the intermediate pressure chamber 624;

(c) open the pressure chamber outlet valve 632 and allow a rapid depressurization of the hydrolyzed material through the pressure chamber outlet valve 632 into the expansion chamber 216; and (d) repeat steps (a), (b) and (c) at a regular time interval in a range of from 2 to 20 seconds.

Preferably in step (d) the regular time interval may be in a range of from 5 to 10 seconds.

In a further embodiment of the method described above, the method may include prior to step (a), hydrolyzing the material in the hydrolyzer 600 by exposing the material to steam at a pressure in a range of from 120 psi to 130 psi and a corresponding temperature in a range of from 300 degrees F. to 400 degrees F. for a time interval of from 10 to 30 minutes so that the steam crosses cell membranes of organic material contained in the material. Between steps (b) and (c) the material may be maintained in the intermediate pressure vessel 634 at a pressure of at least 110 psi. In step (c) the rapid depressurization of the material may rupture cell walls of the organic material thereby forming an aggregate cellulose pulp having an expanded surface area.

In a further embodiment of the method in step (a) the material is allowed to fall at least in part due to the force of gravity from the hydrolyzer 600 into the intermediate pressure chamber 624.

It will be appreciated that the timing of the opening and closing of the valves 630 and 632 as controlled by controller 652 determines the flow rate of material through the described process. Each repetition of steps (a), (b), (c) and (d) removes a known mass and/or volume of material from the hydrolyzer 600 and control of the time interval for repetition of steps (a), (b), (c) and (d) controls a flow rate of material through the hydrolyzer 600 and thus controls a residence time of the material in the hydrolyzer 600.

Accordingly adjusting the time interval for repetition of steps (a), (b), (c) and (d) thereby controls a flow rate of material through the hydrolyzer 600 and a residence time of the material in the hydrolyzer 600.

In one embodiment that flow rate may be controlled in response to the loading of the hydrolyzer 214. One way to measure that loading is to measure the electric current flowing to an electric motor driving the rotating mixer shaft 620. The amperage drawn by the electric motor increases as the amount of material in the hydrolyzer 214 increases.

The Anaerobic Digestion Process

As discussed above the ACP 660 provided by the above processes is particularly suited for anaerobic digestion and the production of biogas and other useful products. The ACP material 660 provided by the above processes has been tested for its potential biogas production using standard Biomethane Potential Assay for its potential biogas production. The test results indicated biogas potential as follows:

| Sample | % Methane | Nl/kg VS | % VS |
|---|---|---|---|
| 1 | 67.80% | 145 | 76% |
| 2 | 63.70% | 254 | 73 |
| 3 | 54.00% | 392 | 45 |
| AVG | 61.83% | 264 | 65 |

The resultant biogas is also a low producer of H2S (hydrogen sulfide) allowing its use in many energy systems without expensive scrubbing.

The anaerobic digester 215 may be any one of many known types of anaerobic digester suitable for use in a relatively high-solids semi-continuous or batch type anaerobic digestion process. For example, there are several suppliers of High Solids Anaerobic Digesters (HSAD) that provide technologies that have been used to digest sorted municipal waste and produce biogas and compost. The most common is a garage style vessel. Waste is placed in the digester and the "garage" is sealed and liquid, called percolate, inundates the feedstock and begins the degradation process. The material remains in the digester for a period of about 28 days and is then removed and the process starts over. This digester is primarily used for source separated organics and for the organic fraction of municipal waste separated at a material recovery facility. The other type of digester uses a cylindrical digester vessel, place either horizontally or vertically, and the sorted waste is mixed with water to a moisture content of 70% to 80%. The slurry is pumped into the digester. The digester may be equipped with a stirring mechanism that mixes the material. The material remains in the digester for 14 to 21 days, dependent on the operating temperature.

In one embodiment a process of transforming a stream of MSW material into feedstock for the anaerobic digester and the resulting generation of biogas and other useful products may be described as:

(a) receiving a stream of municipal solid waste (MSW) material 201;

(b) removing one or more selected chlorine containing components from the stream of MSW material to reduce a relative chlorine content of the stream of MSW material;

(c) retaining in the stream of MSW material substantially all paper components so as to maintain a relative carbon content of the stream of MSW material;

(d) removing at least a majority of all metal and inorganic components from the stream of MSW material;

(e) after steps (b), (c) and (d), receiving in a hydrolyzer 214 the stream of MSW material including at least 70% by mass of the stream of MSW material received in step (a);

(f) hydrolyzing the stream of MSW material in the hydrolyzer 214 by exposing the stream of MSW material to pressurized steam so that the steam crosses cell membranes of organic material contained in the stream of MSW material;

(g) discharging the stream of MSW material from the hydrolyzer 214 to a reduced pressure zone 216 so that a rapid decompression of the stream of MSW material ruptures cell walls of the organic material thereby forming an aggregate cellulose pulp 660 having an expanded surface area; and (h) receiving the stream of MSW material including the aggregate cellulose pulp in an anaerobic digester 215 and digesting the stream of MSW material to generate a biogas, the stream of MSW material received in the anaerobic digester including at least 70% by mass of the stream of MSW material received in step (a).

The phrase "substantially all" as used herein, means at least 90% of the indicated quantity.

A biogas output in step (h) is improved due to the reduction of the relative chlorine content of the stream of MSW material in step (b).

The biogas output in step (h) is further improved due to the expanded surface area of the aggregate cellulose pulp formed in step (g).

The biogas output in step (h) is further improved due to an increased carbon to nitrogen ratio of the aggregate cellulose pulp resulting from the retaining of paper components in step (c). In step (h) the stream of MSW material received in the anaerobic digester preferably has a carbon to nitrogen ratio of at least 30:1 by mass.

Step (b) of removing one or more selected chlorine containing components may be accomplished in multiple ways. One option includes separating of Polyvinyl Chloride (PVC) components from the stream of MSW material.

The option of separating PVC components from the stream of MSW material may be accomplished by:

shredding the stream of MSW material in the primary shredder 204;

separating the shredded stream of MSW material into a smaller piece stream 232 and larger piece stream 234 with a primary separator 231;

downstream of the primary separator 231 separating at least a portion of the larger piece stream with a 2D/3D separator 242 into a stream of substantially two-dimensional pieces 244 and a stream of substantially three-dimensional pieces 246; and removing polyvinylchloride (PVC) pieces 250 from the stream of substantially three-dimensional pieces 246 using an optical sorter 248.

Step (c) of retaining in the stream of MSW material substantially all paper components so as to maintain a relative carbon content of the stream of MSW material may be accomplished by:

shredding the stream of MSW material in the primary shredder 204;

separating the shredded stream of MSW material into a smaller piece stream 232 and larger piece stream 234 with a primary separator 231;

downstream of the primary separator 231 separating at least a portion of the larger piece stream 234 with a 2D/3D separator 242 into a stream of substantially two-dimensional pieces 244 and a stream of substantially three-dimensional pieces 246;

removing at least one non-paper component 250, 256 from the stream of substantially three-dimensional pieces 246; and recombining the stream of substantially three-dimensional pieces 258 and the stream of substantially two-dimensional pieces 244 after removing the at least one non-paper component 250, 256 from the stream of substantially three-dimensional pieces 246, the recombined stream including substantially all of the paper material that was in the stream of MSW material 201 received in step (a).

The at least one non-paper component removed from the stream of substantially three-dimensional pieces 246 may include PVC containers 250 and non-ferrous metal containers 256.

By the processes described above at least 70%, preferably at least 75%, and more preferably at least 80%, by mass of the incoming stream of MSW material may be directed into the hydrolyzer and converted to aggregate cellulose material which is then fed to the anaerobic digester. Digestate left over from the anaerobic digestion process may then be converted into fuel material which can be burned for further energy recovery and/or converted into other useful products. This greatly reduces the portion of the incoming MSW stream which ultimately winds up in a landfill. Furthermore, the processing of the MSW material to reduce chlorine content and to maintain carbon content enhances the production of aggregate cellulose pulp in the hydrolyzer and the subsequent production of biogas in the anaerobic digester.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A process for transforming waste material into useful products, the process comprising steps of:

a) receiving a stream of municipal solid waste (MSW) material;

b) removing one or more selected chlorine containing components from the stream of MSW material to reduce a relative chlorine content of the stream of MSW material;

c) retaining in the stream of MSW material substantially all paper components so as to maintain a relative carbon content of the stream of MSW material;

d) removing at least a majority of all metal and inorganic components from the stream of MSW material;

e) after steps (b), (c) and (d), receiving in a hydrolyzer the stream of MSW material including at least 70% by mass of the stream of MSW material received in step (a);

f) hydrolyzing the stream of MSW material in the hydrolyzer by exposing the stream of MSW material to pressurized steam so that the steam crosses cell membranes of organic material contained in the stream of MSW material;

g) discharging the stream of MSW material from the hydrolyzer to a reduced pressure zone so that a rapid decompression of the stream of MSW material ruptures cell walls of the organic material thereby forming an aggregate cellulose pulp having an expanded surface area; and h) receiving the stream of MSW material including the aggregate cellulose pulp in an anaerobic digester and digesting the stream of MSW material to generate a biogas, the stream of MSW material received in the anaerobic digester including at least 70% by mass of the stream of MSW material received in step (a).

2. The process of claim 1, wherein:
step (b) includes separating of Polyvinyl Chloride (PVC) components from the stream of MSW material.

3. The process of claim 1, wherein step (b) further comprises:
shredding the stream of MSW material;
separating the shredded stream of MSW material into a smaller piece stream and larger piece stream with a primary separator;
downstream of the primary separator separating at least a portion of the larger piece stream with a 2D/3D separator into a stream of substantially two-dimensional pieces and a stream of substantially three-dimensional pieces; and
removing polyvinylchloride (PVC) pieces from the stream of substantially three-dimensional pieces using an optical sorter.

4. The process of claim 1, further comprising:
after step (h) discharging a digestate material from the anaerobic digester; and
drying the digestate material.

5. The process of claim 1, wherein:
in step (e) the stream of MSW material received in the hydrolyzer includes at least 75% by mass of the stream of MSW material received in step (a);
in step (h) the stream of MSW material received in the anaerobic digester includes at least 75% by mass of the stream of MSW material received in step (a).

6. The process of claim 1, wherein step (c) further comprises:
shredding the stream of MSW material;
separating the shredded stream of MSW material into a smaller piece stream and larger piece stream with a primary separator;
downstream of the primary separator separating at least a portion of the larger piece stream with a 2D/3D separator into a stream of substantially two-dimensional pieces and a stream of substantially three-dimensional pieces;
removing at least one non-paper component from the stream of substantially three-dimensional pieces; and
recombining the stream of substantially three-dimensional pieces and the stream of substantially two-dimensional pieces after removing the at least one non-paper component from the stream of substantially three-dimensional pieces, the recombined stream including substantially all of the paper material that was in the stream of MSW material received in step (a).

7. The process of claim 6, wherein:
the at least one non-paper component removed from the stream of substantially three-dimensional pieces includes PVC containers and non-ferrous metal containers.

8. The process of claim 1, wherein:
a biogas output in step (h) is improved due to the reduction of the relative chlorine content of the stream of MSW material in step (b).

9. The process of claim 1, wherein:
a biogas output in step (h) is improved due to sterilization of the stream of MSW material in step (f).

10. The process of claim 1, wherein:
a biogas output in step (h) is improved due to the expanded surface area of the aggregate cellulose pulp formed in step (g).

11. The process of claim 1, wherein:
a biogas output in step (h) is improved due to an increased carbon to nitrogen ratio of the aggregate cellulose pulp resulting from the retaining of paper components in step (c).

12. The process of claim 1, wherein step (g) further comprises:
(g)(1) opening a first valve between an outlet of a hydrolyzing chamber and an intermediate chamber;
(g)(2) receiving a portion of the stream of MSW material in the intermediate chamber at substantially the same pressure and temperature as maintained in the hydrolyzing chamber;
(g)(3) closing the first valve;
(g)(4) opening a second valve between the intermediate chamber and the reduced pressure discharge zone;
(g)(5) closing the second valve; and
repeating steps (g)(1)-(g)(5) at a preset time interval.

13. The process of claim 12, wherein:
the preset time interval is in a range of from 2 seconds to 20 seconds.

14. The process of claim 12, wherein:
the opening of the second valve in step (g)(5) occurs in no greater than 2.0 seconds.

15. The process of claim 1, wherein:
in step (f) the MSW material is exposed to steam at a pressure of at least 120 psi and a temperature of at least 300 degrees F. for a time interval of at least 10 minutes.

16. The process of claim 1, wherein:
in step (f) the MSW material is exposed to steam at a pressure in a range of from 120 psi to 130 psi and a temperature in a range of from 300 degrees F. to 400 degrees F. for a time interval of from 10 to 30 minutes.

17. The process of claim 1, further comprising:
during step (g), recovering a stream of steam condensate from the low pressure zone; and
directing the stream of steam condensate to the anaerobic digester.

18. The process of claim 1, wherein:
in step (h) the stream of MSW material received in the anaerobic digester has a carbon to nitrogen ratio of at least 30:1.

19. The process of claim 1, wherein:
in step (h) the anaerobic digester is a high solids type anaerobic digester.

* * * * *